United States Patent
Elad et al.

(10) Patent No.: US 10,178,018 B2
(45) Date of Patent: Jan. 8, 2019

(54) TRANSMISSION AND RECEPTION DEVICES

(71) Applicant: Huawei Technologies Co., Ltd., Shenzhen (CN)

(72) Inventors: Yuval Elad, Munich (DE); Alex Tal, Munich (DE); Rami Zecharia, Munich (DE); Alex Umansky, Munich (DE)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 117 days.

(21) Appl. No.: 15/076,250

(22) Filed: Mar. 21, 2016

(65) Prior Publication Data

US 2016/0205013 A1 Jul. 14, 2016

Related U.S. Application Data

(63) Continuation of application No. PCT/EP2013/069418, filed on Sep. 19, 2013.

(51) Int. Cl.
| | |
|---|---|
| *H04L 12/727* | (2013.01) |
| *H04L 12/801* | (2013.01) |
| *H04L 12/863* | (2013.01) |
| *H04L 12/947* | (2013.01) |
| *H04L 12/861* | (2013.01) |
| *H04L 12/879* | (2013.01) |

(52) U.S. Cl.
CPC ............ *H04L 45/121* (2013.01); *H04L 47/18* (2013.01); *H04L 47/50* (2013.01); *H04L 49/25* (2013.01); *H04L 49/9057* (2013.01); *H04L 47/13* (2013.01); *H04L 49/901* (2013.01)

(58) Field of Classification Search
CPC .......... H04L 45/00; H04L 49/00; H04L 47/00
See application file for complete search history.

(56) References Cited

U.S. PATENT DOCUMENTS

| | | | |
|---|---|---|---|
| 6,714,985 B1 * | 3/2004 | Malagrino | .............. H04L 29/06 370/394 |
| 7,912,979 B2 | 3/2011 | Biran et al. | |

(Continued)

FOREIGN PATENT DOCUMENTS

| | | |
|---|---|---|
| CN | 102668495 A | 9/2012 |
| WO | 2007064116 A1 | 6/2007 |

OTHER PUBLICATIONS

Foreign Communication From a Counterpart Application, PCT Application No. PCT/EP2013/069418, International Search Report dated Feb. 10, 2014, 4 pages.

(Continued)

*Primary Examiner* — Andrew Lai
*Assistant Examiner* — Sumitra Ganguly
(74) *Attorney, Agent, or Firm* — Conley Rose, P.C.

(57) ABSTRACT

A method and devices for reducing the delay in end-to-end delivery of network packets may be achieved by having the transmission (TX) side of the device, tag each cell with a unique packet identifier and with a byte offset parameter where the tagging allows the reception (RX) side of the destination device to perform on-the-fly assembly of cells into packets by directly placing them at corresponding host buffer, and the method may be done for multiple packets concurrently, and hence store and forward buffering is not needed in either the source or the destination devices and the lowest possible end-to-end cut-through latency is achieved.

18 Claims, 5 Drawing Sheets

(56) References Cited

U.S. PATENT DOCUMENTS

2005/0144310 A1\* 6/2005 Biran .................... H04L 47/193
709/234
2012/0084456 A1 4/2012 Vonog et al.

OTHER PUBLICATIONS

Foreign Communication From a Counterpart Application, PCT Application No. PCT/EP2013/069418, Written Opinion dated Feb. 10, 2014, 6 pages.

\* cited by examiner

TRANSMISSION AND RECEPTION DEVICES

CROSS-REFERENCE TO RELATED APPLICATIONS

This application is a continuation of International Application No. PCT/EP2013/069418, filed on Sep. 19, 2013, which is hereby incorporated by reference in its entirety.

TECHNICAL FIELD

The present disclosure relates to a transmission (TX) device configured for transmitting multiple read requests with respect to network packets and transmitting fabric cells based on a stream of completion packets in response to the read requests. The disclosure further relates to a reception (RX) device configured for receiving fabric cells and constructing network packets based on a payload and location information in the fabric cells.

Aspects of the disclosure relate to modern high-speed switching systems that interconnect multiple servers which are co-located under a shared physical enclosure through a shared fabric interconnect. The physical plane or backplane that interconnects these servers can be peripheral component interconnect PCI express (PCIe) or any proprietary fabric that supports cell-based switching. The networking protocol that runs over the physical plane and logically interconnects the servers can be (but not limited to) standard Internet Protocol (IP) over Layer 2 Ethernet, fibre channel over Ethernet (FCoE), remote direct memory access (RDMA) over converged Ethernet (RoCE) or INFINIBAND. The disclosure defines a method to deliver network packets between the memory subsystems of two hosts across the physical interconnect in a pure end-to-end cut-through fashion. The disclosure may be applied in conjunction with a variety of software networking stacks, both sockets based and verbs based (e.g. RDMA).

BACKGROUND

Recent technologies allow implementing networking protocols, such as Ethernet or INFINIBAND, between multiple hosts over a variety of physical interfaces which are not necessary the protocol's native physical layer. For example, Ethernet networking within a blade or a rack enclosure may use PCIe or some vendor proprietary physical interconnect as the physical layer (PHY) instead of using native 802.3 media access control (MAC) and PHY interconnects. The communication model in such systems is typically based on the well-known logical operations of send( ), i.e. the logical operation of sending information, e.g. messages or data packets and receive( ), i.e. the logical operation of receiving information, e.g. messages or data packets that are used for sourcing and sinking the logical units of communications (which are messages or data packets) and are performed by the transmitting and receiving sides respectively. The data flow begins with a send( ) operation in which the application posts a data buffer to the host kernel to be transmitted over the fabric. The buffer is passed through the transport and routing stacks of the kernel and will eventually reach the device driver of a network device (e.g. network interface card (NIC) or host bus adapter (HBA)) that serves as an entry point into the fabric. At this point the actual packet data may span multiple physical buffers, for example since the transport and routing stacks may add their headers as part of the process of turning the buffer into a transmittable network packet. The device driver will provide the device with pointers to the locations of the different buffers that compose the network packet. The device, equipped with its own direct memory access (DMA) engine, will then read the different buffers from host memory, compose a network packet and send it across the network fabric. The packet will traverse the fabric and will eventually reach the device of the destination host. The destination device will use its DMA engine to write the packet into a host buffer that was pre-allocated by the software stack by means of a receive( ) operation. When DMA is completed the device driver will receive a corresponding indication and will forward the packet up the relevant networking stack.

While modern fabric interconnects attempt to support cut-through delivery of packets across such fabric interconnect, the support for real end-to-end cut-through is constrained by the host's behavior. The presented disclosure will allow the packet to be sent from the source buffers at the source host into the destination buffer at the destination host using a "pure" cut-through method that allows immediate injection of data into the fabric even if it has arrived out-of-order or interleaved with data of other packets from the memory of the source host.

A data packet should be sent from a memory host location(s) of a source host into a memory host location at a destination host. Each host has an attached "device" and all devices are connected to an interconnect fabric. Each device is responsible for the operations of reading a packet from host memory and sending it into the network fabric and receiving packets from the network fabric and placing them at the host's memory. The device is connected to the memory subsystem of its host through a PCIe interface.

The device at the source reads the packet by submitting PCIe read requests to the multiple buffers that span the packet, building the packet as the payload is received on the corresponding read responses and sending the packet over the interconnect fabric. It is a common practice for high-speed devices to have multiple outstanding read requests submitted on the PCIe fabric in order to allow for saturation of the downstream PCIe link. The PCIe specification allows the completion data of multiple outstanding read requests from the same source to arrive out-of-order with respect to the original read request submission order. Furthermore, the PCIe specification allows the completer of a PCIe read requests to split the read response over multiple completion packets. These two relaxations create a completion stream that may be both out-of-order and interleaved as can be seen from FIG. 5 illustrating the case of two read requests "Read A" and "Read B" 501.

For example, if read requests A, B 501 are submitted one after the other on the PCIe bus then the corresponding read completions 503 may arrive in the following order (starting from left): B1, A1, A2, B2, B3, A3. A standard device interface would need store and forward the completion data 503 before composing it into packets 505 and submitting the packets 505 into the fabric. This buffering would be needed by typical devices for two main reasons: a) If A, B are read requests for buffers that account for a single network packet then data re-ordering is needed since the buffers should be composed into a packet in an order which preserves the original payload order of the packet b) If A, B are read requests where each request represents a separate network packet then re-ordering is needed since the different packets cannot be sent in an interleaved way over the fabric (however note that in our example the read responses for these 3 packets were interleaved by the host). Reference sign 501 describes a read request message, reference sign 503 describes a read completion message and reference sign 505 describes packets of a fabric message in FIG. 5.

The store and forward buffering that was just described introduces a delay Δt that contributes to the end-to-end latency of packets route in the fabric.

SUMMARY

It is the object of the disclosure to provide a technique for reducing a delay in end-to-end delivery of network packets.

This object is achieved by the features of the independent claims. Further implementation forms are apparent from the dependent claims, the description and the figures.

The disclosure is based on the finding that a technique for reducing the delay in end-to-end delivery of network packets can be achieved by having the TX side of the device tag each cell with a unique packet identifier and with a byte offset parameter. That tagging allows the RX side of the destination device to perform on-the-fly assembly of cells into packets by directly placing them at corresponding host buffer. This can be done for multiple packets concurrently. This way no store and forward buffering is needed in either the source or the destination devices and the lowest possible end-to-end cut-through latency is achieved.

The disclosure thus provides a technique for devices that are directly connected to a cell-based switched fabric to achieve pure cut-through delivery by transmitting network packets as a stream of cells that are carried over that fabric, such that cells that belong to the same network packet can be injected at any arbitrary order, including the actual order in which they arrived from the host's memory (which may different than the packet's original byte order) and cells that belong to different network packets may be interleaved with one another as they are injected into the fabric (again while preserving the original order in which they arrived from the host memory). The receiving side will be able to immediately place the data of arriving cells at the correct location within the destination host memory even if cells that belong to the same packet have arrived out-of-order or interleaved with cells of other packets.

In order to describe the disclosure in detail, the following terms, abbreviations and notations will be used.

PCIe, PCI express: peripheral component interconnect express according to PCIe specification.

TX: Transmit/transmission.
RX: Receive/reception.
IP: Internet Protocol.
FCoE: fibre channel over Ethernet.
DMA: direct memory access.
RDMA: remote direct memory access.
RoCE: RDMA over converged Ethernet.
INFINIBAND is a switched fabric communications link used in high performance computing.
802.3 MAC: Institute of Electrical and Electronics Engineers (IEEE) specification for Ethernet protocol.
PHY: physical layer.
NIC: network interface card.
HBA: host bus adapter.
TLP: transaction layer packet according to PCIe specification.
QPI: quick path interconnect is a point-to-point processor interconnect developed by INTEL, also called common system interface (CSI).

According to a first aspect, the disclosure relates to a transmission device comprising a processor configured to submit multiple read request messages over a host interface corresponding to buffers of one or more network packets, to assign for each network packet a unique packet identifier, to calculate for each read request message a start byte offset indicating a relative location of a first completion byte of the read request message within the original network packet, to store the unique packet identifier and the start byte offset as an entry within a transmission database, and upon arrival of completion data from the host interface for the submitted read request messages, for each read response message the processor is further configured to associate the read response message with an entry of the transmission database and extract the packet identifier, to transform the read response message into a fabric cell by the following operations: to mark the fabric cell with the packet identifier, to mark the fabric cell with a byte offset indicating a relative start byte offset of the fabric cell within the associated network packet, wherein the byte offset is calculated by summing a relative start offset of the corresponding read request message and a location of the read response message within an entire stream of completion bytes of that read request message, to mark the fabric cell with a first flag if the fabric cell represents a first fabric cell of the network packet and a last flag if the fabric cell represents a last fabric cell of the network packet, to release the transmission database (113) entry if the fabric cell is marked with the last flag, and to submit the fabric cell over a fabric interface.

By marking the fabric cell with the packet identifier and a byte offset indicating a relative start byte offset of the fabric cell within the associated network packet, wherein the byte offset is calculated by summing a relative start offset of the corresponding read request message and a location of the read response message within an entire stream of completion bytes of that read request message, a corresponding RX device is able to assign the received cells directly to buffer addresses in the correct sequence. Therefore, no extra buffering is required for reconstructing the correct transmission sequence. The TX device can thus provide an ultra-low latency transfer of data packets between the memory subsystems of two hosts. By the marking, an interleaved and out-of-order data delivery scheme can be realized.

In a first possible implementation form of the transmission device according to the first aspect, read response messages that belong to different read request messages are arriving out-of-order with respect to a read request submission order.

By applying the marking scheme, out-of-order delivery can be tolerated without producing extra delay for buffers reconstructing the original sequence.

In a second possible implementation form of the transmission device according to the first aspect as such or according to the first implementation form of the first aspect, the TX device is configured to submit multiple read request messages over the host interface before processing a read response message.

By submitting multiple read request messages over the host interface before processing a read response message, the transmission channel can be efficiently used.

In a third possible implementation form of the transmission device according to the first aspect as such or according to any of the preceding implementation forms of the first aspect, a single read request message is responded with multiple read response messages.

By replying a single read request message with multiple read response messages, long packets can be partitioned into smaller packets that can be efficiently processed. Further, delay can be reduced when processing shorter packets.

In a fourth possible implementation form of the transmission device according to the first aspect as such or according to any of the preceding implementation forms of the first aspect, the read response messages of different read request messages are interleaved with one another upon arrival.

The TX device is thus able to process interleaved and out-of-order data and thereby guarantees an efficient usage of the data interfaces.

In a fifth possible implementation form of the transmission device according to the first aspect as such or according to any of the preceding implementation forms of the first aspect, the host interface comprises a PCIe interface or a QPI interface.

Using a PCIe interface or a QPI interface, the transmission device can be applied in standard end-to-end systems where PCIe or QPI is used as the standard data transmission.

In a sixth possible implementation form of the transmission device according to the first aspect as such or according to any of the preceding implementation forms of the first aspect, the read request messages comprise PCIe read requests and the read response messages comprise completion TLPs.

Using PCIe read requests and completion TLPs, the transmission interface can be easily operated in a PCIe system that is an industry standard.

In a seventh possible implementation form of the transmission device according to the first aspect as such or according to any of the preceding implementation forms of the first aspect, the packet identifier is set in a header field of the fabric cell and the byte offset is set in a header field of the fabric cell.

When the packet identifier is set in a header field of the fabric cell and the byte offset is set in a header field of the fabric cell, processing can be increased as the header of the fabric cell is at the beginning of the fabric cell. When looking up the whole fabric cell, relevant information can be found fast.

In a seventh possible implementation form of the transmission device according to the first aspect as such or according to any of the preceding implementation forms of the first aspect, the TX device comprises a DMA engine configured to process the submission of the multiple read request messages and the read response messages, and an open transmission database configured to store the unique packet identifier and the start byte offset.

According to a second aspect, the disclosure relates to a transmission system, comprising a TX device according to the first aspect as such or according to any of the preceding implementation forms of the first aspect, and a host memory coupled to the transmission device by the host interface, wherein the host memory is configured to process the multiple read request messages submitted from the TX device and to respond to them with read response messages.

Using such TX device, the transmission system can provide an ultra-low latency transfer of data packets between the memory subsystems of two hosts. An interleaved and out-of-order data delivery scheme can be realized.

According to a third aspect, the disclosure relates to a reception device comprising a processor configured to perform the following operations upon reception of a fabric cell: if the fabric cell is marked with a first flag: extract a packet identifier from the fabric cell, allocate a new RX buffer from an RX ring buffer of a host memory obtaining an RX buffer address, associate the packet identifier and the RX buffer address by adding them as an entry in a reassembly database, write a payload of the fabric cell to a host memory address corresponding to the RX buffer address incremented by a byte offset extracted from the fabric cell; if the fabric cell is not marked with a first flag: extract a packet identifier from the fabric cell, lookup the packet identifier in the reassembly database and extract the RX buffer address therefrom, write a payload of the fabric cell to a host memory address corresponding to the RX buffer address incremented by a byte offset extracted from the fabric cell; if the fabric cell is marked with a last flag perform on top of the above operations the following: delete the entry in the reassembly database after the payload of the fabric cell is written to the host memory address, notify a driver that a new network packet has arrived, notify the driver of any error conditions that were encountered.

When the reception device processes fabric cells which payload includes a packet identifier and a byte offset written by the corresponding transmission device onto the payload, the reception device is able to assign the received cells directly to buffer addresses in the correct sequence. Therefore, no extra buffering is required for reconstructing the correct transmission sequence. The RX device can thus provide an ultra-low latency transfer of data packets between the memory subsystems of two hosts. By the marking of the fabric cells, an interleaved and out-of-order data delivery scheme can be realized.

In a first possible implementation form of the reception device according to the third aspect, the RX device comprises a DMA engine configured to process the reception of the fabric cells, and an open reassembly database configured to store the packet identifier and the RX buffer address.

When the open reassembly database is implemented on the reception device memory accesses for evaluating the transmission states are very fast.

According to a fourth aspect, the disclosure relates to a reception system, comprising an RX device according the third aspect as such or according to the first implementation form of the third aspect, and a host memory coupled to the reception device by a host interface, wherein the host memory comprises at least one RX buffer and an RX buffer ring holding addresses of the at least one RX buffers.

Using such RX device, the reception system can provide an ultra-low latency transfer of data packets between the memory subsystems of two hosts. An interleaved and out-of-order data delivery scheme can be realized.

According to a fifth aspect, the invention relates to a transmission method, comprises the following steps.

(1) Submitting multiple read request messages over a host interface corresponding to buffers of one or more network packets.

(a) Assigning for each network packet a unique packet identifier.

(b) Calculating for each read request message a start byte offset indicating a relative location of a first completion byte of the read request message within the original network packet.

(c) Storing the unique packet identifier and the start byte offset as an entry within a transmission database.

(3) Upon arrival of completion data from the host interface for the submitted read request messages, for each read response message, performing the following steps.

(a) Associating the read response message with an entry of the database and extract the packet identifier.

(b) Transforming the read response message into a fabric cell by the following operations.

(c) Marking the fabric cell with the packet identifier.

(d) Marking the fabric cell with a byte offset indicating a relative start byte offset of the fabric cell within the associated network packet, wherein the byte offset is calculated by summing a relative start offset of the corresponding read request message and a location of the read response message within an entire stream of completion bytes of that read request message.

(e) Marking the fabric cell with a first flag if the fabric cell represents a first fabric cell of the network packet and a last flag if the fabric cell represents a last fabric cell of the network packet.

(f) Releasing the transmission database entry if the fabric cell is marked with the last flag.

(g) Submitting the fabric cell over a fabric interface.

By marking the fabric cell with the packet identifier and a byte offset indicating a relative start byte offset of the fabric cell within the associated network packet, wherein the byte offset is calculated by summing a relative start offset of the corresponding read request message and a location of the read response message within an entire stream of completion bytes of that read request message, a corresponding reception method, e.g. implemented in a reception device, is able to assign the received cells directly to buffer addresses in the correct sequence. Therefore, no extra buffering is required for reconstructing the correct transmission sequence. The transmission method can thus provide an ultra-low latency transfer of data packets between the memory subsystems of two hosts. By the marking, an interleaved and out-of-order data delivery scheme can be realized.

According to a sixth aspect, the disclosure relates to a reception method, comprising performing the following operations upon reception of a fabric cell.

(4a) If the fabric cell (Cell A1) is marked with a first flag performing the following operations.

(i) Extracting a packet identifier from the fabric cell.

(ii) Allocating a new RX buffer from an RX ring buffer of a host memory obtaining an RX buffer address.

(iii) Associating the packet identifier and the RX buffer address by adding them as an entry in a reassembly database.

(iv) Writing a payload of the fabric cell to a host memory address corresponding to the RX buffer address incremented by a byte offset extracted from the fabric cell.

(4b) If the fabric cell (Cell A1) is not marked with a first flag perform the following operations.

(i) Extracting a packet identifier from the fabric cell.

(ii) Looking-up the packet identifier in the reassembly database and extract the RX buffer address therefrom.

(iii) Writing a payload of the fabric cell to a host memory address corresponding to the RX buffer address incremented by a byte offset extracted from the fabric cell.

(4c) If the fabric cell (Cell A1) is marked with a last flag perform on top of the above operations the following operations.

(i) Deleting the entry in the reassembly database after the payload of the fabric cell is written to the host memory address.

(ii) Notifying a driver that a new network packet has arrived.

(iii) Notifying the driver of any error conditions that were encountered.

When the reception method processes fabric cells which payload includes a packet identifier and a byte offset written by the corresponding transmission method onto the payload, the reception method is able to assign the received cells directly to buffer addresses in the correct sequence. Therefore, no extra buffering is required for reconstructing the correct transmission sequence. The reception method can thus provide an ultra-low latency transfer of data packets between the memory subsystems of two hosts. By the marking of the fabric cells, an interleaved and out-of-order data delivery scheme can be realized.

Aspects of the disclosure provide a System and method for ultra-low latency transfer of data packets between the memory subsystems of two hosts using an interleaved and out-of-order data delivery scheme.

The methods, systems and devices described herein may be implemented as software in a digital signal processor (DSP), in a micro-controller or in any other side-processor or as hardware circuit within an application specific integrated circuit (ASIC).

The disclosure can be implemented in digital electronic circuitry, or in computer hardware, firmware, software, or in combinations thereof, e.g. in available hardware of conventional mobile devices or in new hardware dedicated for processing the methods described herein.

BRIEF DESCRIPTION OF THE DRAWINGS

Further embodiments of the disclosure will be described with respect to the following figures, in which.

DETAILED DESCRIPTION OF EMBODIMENTS

Figure 1:
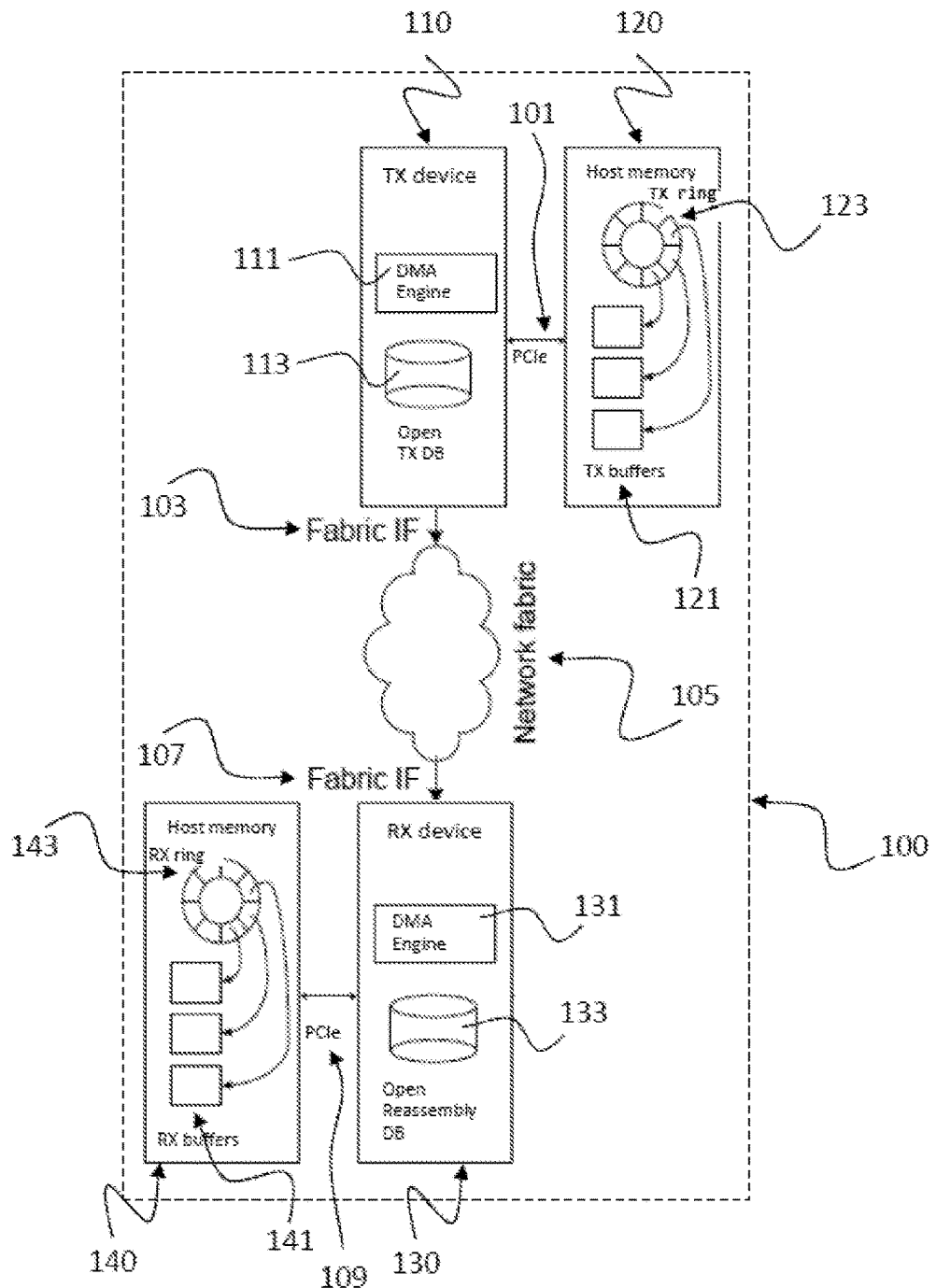
FIG. 1 shows a block diagram illustrating an end-to-end switching system 100 including a transmission device, a TX host memory, a reception device and an RX host memory according to an implementation form.

FIG. 1 shows a block diagram illustrating an end-to-end switching system 100 including a TX device 110, a TX host memory 120, an RX device 130 and an RX host memory 140 according to an implementation form. The figure shows a single direction. Both devices may also operate with respect to the opposite direction.

At the foundation of the system 100 there is a group of hosts which are interconnected by a switched fabric 105 through "interface devices" TX device 110, RX device 130. Each RX/TX device 110, 130 has direct access to its attached host's memory 120, 140 and serves as a gateway for the host into the fabric 105. The networking protocol that is implemented above the fabric 105 can be Ethernet, INFINIBAND, RAPIDIO, fiber channel, Cell or other. The basic logical unit of communication for this networking protocol is referred to as a "network packet".

The communication model between the host and the RX/TX device 110, 130 is implemented by a device driver and typically managed through a set of TX ring 123 and RX ring 143. The TX ring 123 is used by the driver for posting buffers 121 of network packets that should be transmitted by the TX device 110 into the fabric 105. The RX ring 143 is used by the driver for posting of buffers 141 that the RX device 130 is expected to fill with network packets that arrive on its fabric interface 107 (for the description below a single RX buffer per network packet is assumed).

The RX/TX device 110, 130 directly accesses buffers (for read or for write) through its DMA mechanisms. The functionality of each RX/TX device 110, 130 is split to a TX engine 111 and an RX engine 131. The TX engine 111 includes a DMA mechanism that can directly access the memory buffer(s) 121 where a network packet is located, fetch the data and transmit it over the network link 105 as a group of cells. The RX engine 131 includes a DMA mechanism that can receive network packets cells and directly place their payload in a host buffer 141 until a complete network packet is constructed. The RX engine 131 may support the placement of multiple packets concurrently by maintaining an open reassembly database 133 which is explained in more detail below.

In an implementation form, the physical interface that connects the RX/TX device 110, 130 to the Host memory cluster 120, 140 is PCIe 109, 101.

The cell-based switched fabric 105 that interconnects all devices 110, 130 may have any fabric topology (clos, fat tree, other) and there are no restrictions on the routing algorithms that are implemented by it. Furthermore, the fabric 105 may support active-active topologies using multi-path algorithms without impacting the correctness of the algorithm presented below. The level of multi-pathing affects only the number of entries in the open reassembly database 133.

The end-to-end operation of transferring a network packet between a source host and a destination host is composed of the following steps.

TABLE 1

| | |
|---|---|
| 1. | The TX engine submits multiple PCIe read requests over the PCIe bus that correspond to the buffers of one or more network packets. |
| 1a. | For each network packet the engine assigns a unique packet identifier (PID). |
| 1b. | For each PCIe read request the engine calculates a start byte offset which indicates the relative location of the first completion byte of the request within the original network packet. |
| 1c. | These parameters are stored in an entry within the Open Transmission database. |
| 2. | The host's memory subsystem is processing the multiple read requests and responds to them with completion packets. Completion packets that belong to different read requests may arrive out-of-order with respect to the read request submission order. Also, since the memory subsystem may respond to a single read request with multiple completion packets the completion packets of different read requests may be interleaved with one another as they arrive to the interface device. |
| 3. | As completion data for the submitted read requests arrive from the host the TX engine performs the following operations for each completion TLP: |
| 3a. | Associate the completion TLP with an Open Transmission database entry, extract PID. |
| 3b. | Transform the completion TLP into a fabric cell |
| 3c. | Set in the fabric cell header the PID field |
| 3d. | Set in the fabric cell header the ByteOffset field which indicates the cell's relative start offset within the associated network packet. The ByteOffset field is calculated by summing the corresponding read request's relative start offset and the location of the completion TLP within the entire completion byte stream of that read request. |
| 3e. | Set in the fabric cell header the "First" flag (which indicates the first fabric cell of a network packet) and "Last" flag (which indicates the last fabric cell of a network packet) fields. |
| 3f. | If "Last" flag is set release the Open Transmission database entry |
| 3g. | Inject the fabric cell into the fabric |

Table 1 steps performed at a transmission side of an end-to-end connection.

When the RX engine receives a fabric cell it does the following operations.

TABLE 2

| | |
|---|---|
| 4a. | If this is a "First" fabric cell: |
| | i. Extract PID |
| | ii. Allocate a new RX buffer from the RX ring |

TABLE 2-continued

| | |
|---|---|
| | iii. Associate cell.PID and the RX buffer by adding them as an entry in the Open Reassembly database |
| | iv. Write the payload of the cell to host memory address of (RX buffer address + cell.ByteOffset) |
| 4b. | If this is not a "First" fabric cell: |
| | i. Extract PID |
| | ii. Lookup cell.PID in the Open Reassembly database and extract RX buffer address |
| | iii. Write the payload of the cell to host memory address of (RX buffer address + cell.ByteOffset) |
| 4c. | If this is a "last" fabric cell then on top of the above operations the engine performs the following: |
| | i. Delete Open Reassembly database entry after the cell contents are written to the buffer Delete Open Reassembly database entry after the cell contents are written to the buffer. |
| | ii. Notify the driver that a new network packet has arrived |
| | iii. Notify the driver of any error conditions that were encountered |

Table 2 steps performed at a reception side of an end-to-end connection.

Figure 2:
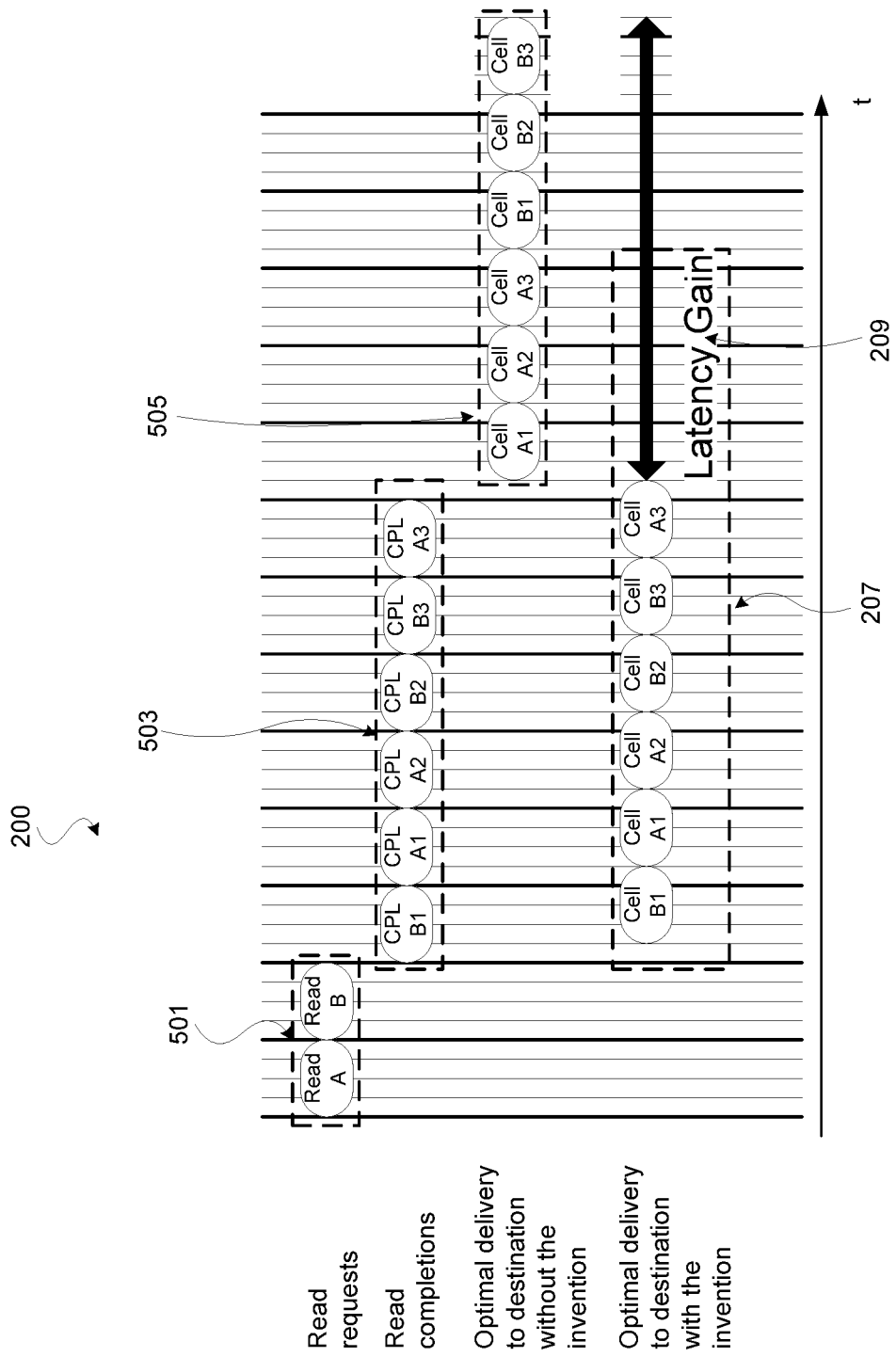
FIG. 2 shows a timing diagram 200 illustrating a timing of completion packets and fabric cells with respect to read requests according to an implementation form.

The operation of the TX engine 111 and the RX engine 131 of an RX/TX device 110, 130 as described above guarantees that the logical view of the communication model is maintained and that network packets are delivered appropriately from the source to the destination. Additionally, the result of the flow described above is that each network packet is written to the destination host at the original byte order in which it has arrived from the source host's memory. This implies that using this technique a truly zero buffering (or pure-cut through) delivery scheme is achieved as shown below with respect to FIG. 2. According to FIG. 2 illustrated and described below, the optimal delivery without the disclosure, i.e. transfer of Cell A1 starts only after the full packet A is read—meaning only after CPL A3 arrives, and then subsequently Cell B1, Cell B2, Cell B3 are transferred.

In an implementation, the TX device 110 is configured to perform the steps 1, 1*a*, 1*b*, 1*c* and 3, 3*a* to 3*g* as described above with respect to Table 1. In an implementation, the host memory 120 is configured to perform step 2 described above in Table 1.

In an implementation, the RX device 130 is configured to perform the steps 4*a*, 4*b* and 4*c* as described above with respect to Table 2.

TX device 110 and RX device 130 may form an end-to-end system for transmitting network packets between two hosts. The hosts may communicate by transmitting send( ) and receive( ) commands at higher layers, e.g. using driver software.

FIG. 2 shows a timing diagram 200 illustrating a timing of completion packets and fabric cells with respect to read requests according to an implementation form.

Read requests A, B 501 are submitted one after the other on the PCIe bus. The corresponding read completions 503 may arrive in the following order (starting from left): B1, A1, A2, B2, B3, A3. A standard device interface would need to store and forward the completion data 503 before composing it into packets 505 and submitting the packets 505 into the fabric. An end-to-end switching system 100 as described above with respect to FIG. 1 may not require such a store and forward buffering of the completion data 503. Instead, the completion data 503 is delivered without additional store-forward buffering. The completion data 503 is transformed to a stream of network cells 207 just upon arrival of each read completion such that a latency saving over the standard system can be realized.

Figure 3:
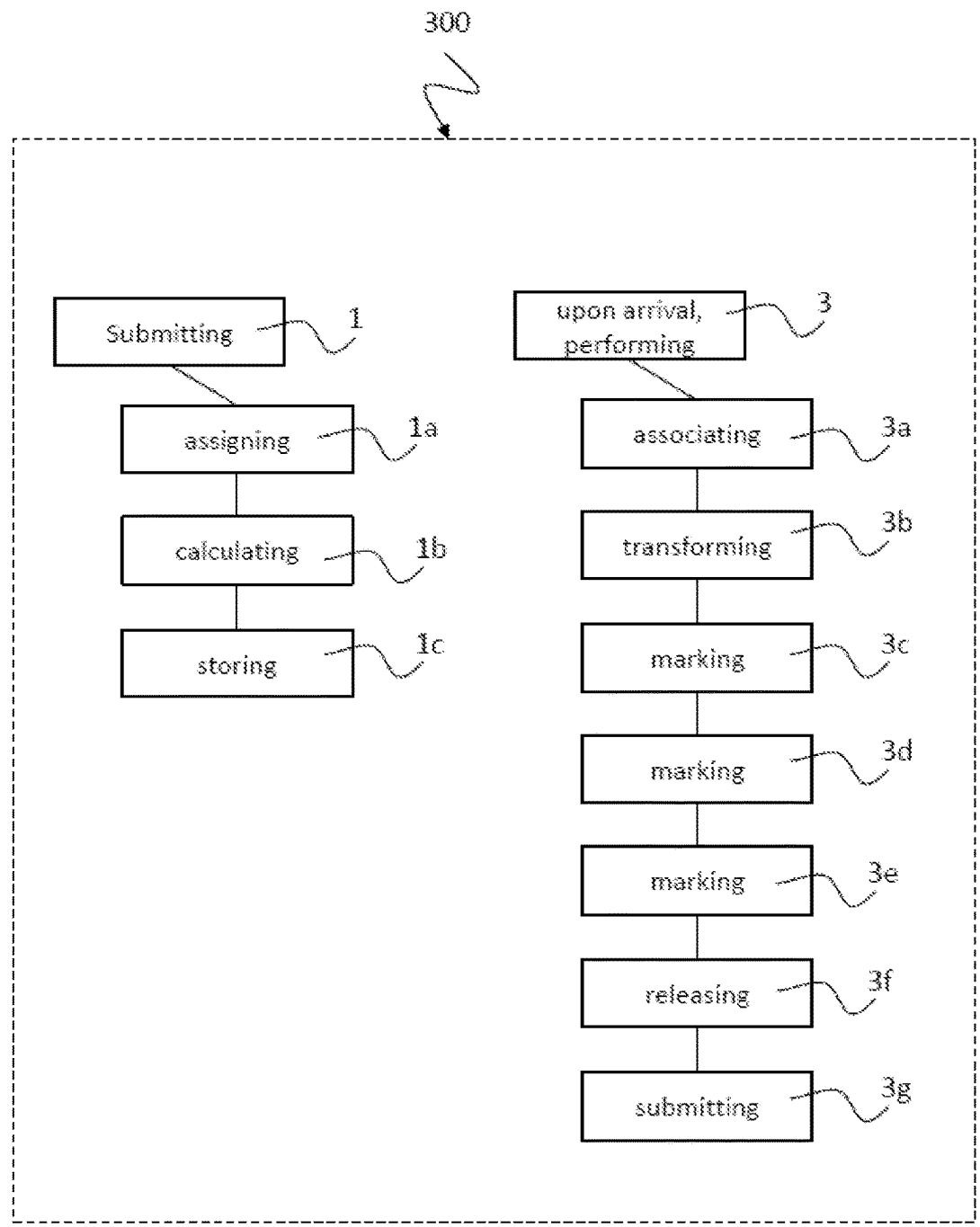
FIG. 3 shows a schematic flowchart diagram of a transmission method 300 according to an implementation form.

FIG. 3 shows a schematic flowchart diagram of a transmission method 300 according to an implementation form.

The transmission method 300 includes the following steps.

Step 1: Submitting multiple read request messages over a host interface corresponding to buffers of one or more network packets.

Step 1a: Assigning for each network packet a unique packet identifier.

Step 1b: Calculating for each read request message a start byte offset indicating a relative location of a first completion byte of the read request message within the original network packet.

Step 1c: Storing the unique packet identifier and the start byte offset as an entry within a transmission database.

Step 3: Upon arrival of completion data from the host interface for the submitted read request messages, the following steps are performed for each read response message.

Step 3a: Associating the read response message with an entry of the database and extract the packet identifier.

Step 3b: Transforming the read response message into a fabric cell by the following operations.

Step 3c: Marking the fabric cell with the packet identifier.

Step 3d: Marking the fabric cell with a byte offset indicating a relative start byte offset of the fabric cell within the associated network packet, wherein the byte offset is calculated by summing a relative start offset of the corresponding read request message and a location of the read response message within an entire stream of completion bytes of that read request message.

Step 3e: Marking the fabric cell with a first flag if the fabric cell represents a first fabric cell of the network packet and a last flag if the fabric cell represents a last fabric cell of the network packet.

Step 3f: Releasing the transmission database entry if the fabric cell is marked with the last flag.

Step 3g: Submitting the fabric cell over a fabric interface.

Item (2) illustrates the processing of the multiple read requests by a host memory. In one example, steps (1) and (3) belong to the transmission method 300. In one example, steps (1), (2) and (3) belong to the transmission method 300.

In an implementation, the method 300 is implemented in a TX device 110 as described above with respect to FIG. 1.

Figure 4:
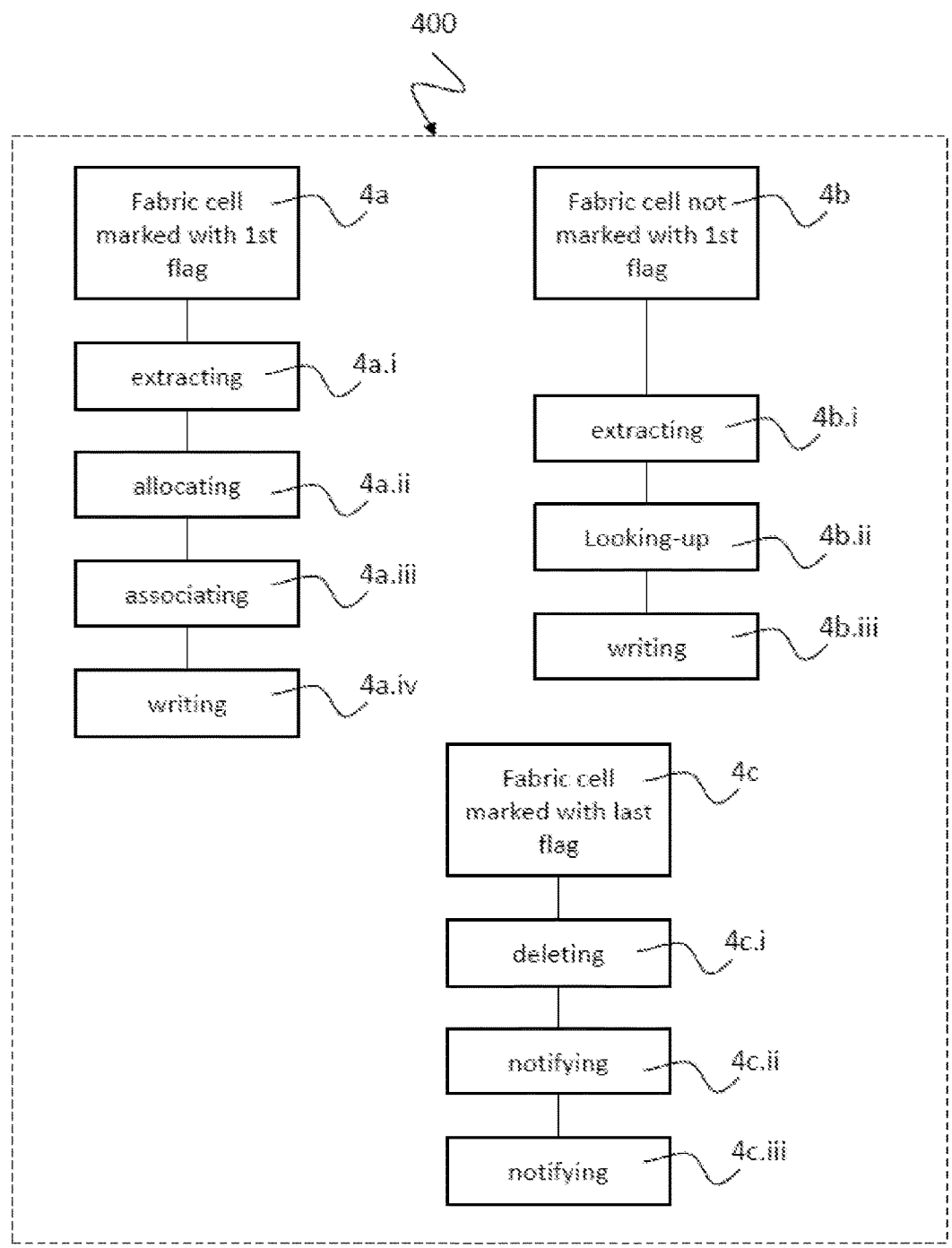
FIG. 4 shows a schematic flowchart diagram of a reception method 400 according to an implementation form.
Figure 5:
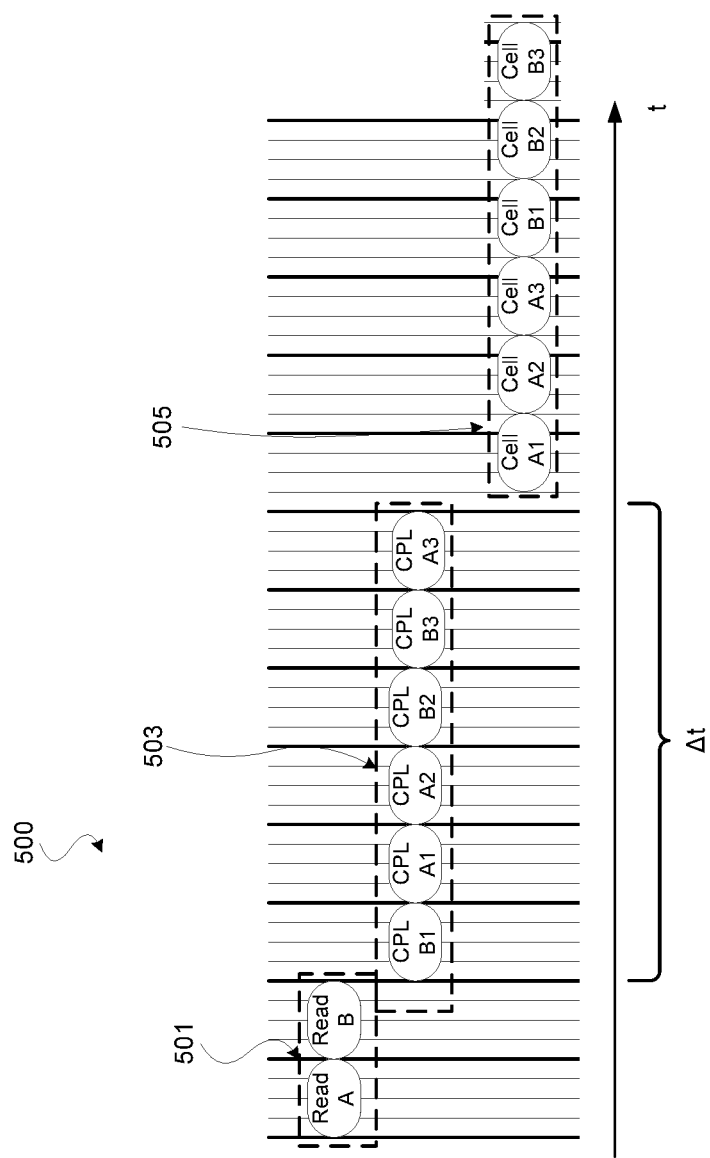
FIG. 5 shows a conventional timing diagram 500 illustrating a delay Δt in the timing of completion packets and fabric cells with respect to read requests.

FIG. 4 shows a schematic flowchart diagram of a reception method 400 according to an implementation form. The reception method 400 includes performing the following steps upon reception of a fabric cell.

Step 4a: If the fabric cell is marked with a first flag performing the following steps.

Step 4a.i: Extracting a packet identifier from the fabric cell.

Step 4a.ii: Allocating a new RX buffer from an RX ring buffer of a host memory obtaining an RX buffer address.

Step 4a.iii: Associating the packet identifier and the RX buffer address by adding them as an entry in a reassembly database.

Step 4a.iv: Writing a payload of the fabric cell to a host memory address corresponding to the RX buffer address incremented by a byte offset extracted from the fabric cell.

Step 4b: If the fabric cell is not marked with a first flag performing the following steps.

Step 4b.i: Extracting a packet identifier from the fabric cell.

Step 4b.ii: Looking-up the packet identifier in the reassembly database and extract the RX buffer address therefrom.

Step 4b.iii: Writing a payload of the fabric cell to a host memory address corresponding to the RX buffer address incremented by a byte offset extracted from the fabric cell.

Step 4c: If the fabric cell (Cell A1) is marked with a last flag perform on top of the above operations, performing the following operations.

Step 4c.i: Deleting the entry in the reassembly database after the payload of the fabric cell is written to the host memory address, Step 4c.ii: Notifying a driver that a new network packet has arrived, and Step 4c.iii: Notifying the driver of any error conditions that were encountered.

In an implementation, the method 400 is implemented in a RX device 130 as described above with respect to FIG. 1.

From the foregoing, it will be apparent to those skilled in the art that a variety of methods, systems, computer programs on recording media, and the like, are provided.

The present disclosure also supports a computer program product including computer executable code or computer executable instructions that, when executed, causes at least one computer to execute the performing and computing steps described herein.

Many alternatives, modifications, and variations will be apparent to those skilled in the art in light of the above teachings. Of course, those skilled in the art readily recognize that there are numerous applications of the disclosure beyond those described herein. While the present disclosures has been described with reference to one or more particular embodiments, those skilled in the art recognize that many changes may be made thereto without departing from the scope of the present disclosure. It is therefore to be understood that within the scope of the appended claims and their equivalents, the disclosure may be practiced otherwise than as further described herein.

What is claimed is:

1. A transmission device comprising:
a processor configured to:
submit a read request message over a host interface corresponding to a buffer of a network packet, the buffer representing the network packet or a part of the network packet;
assign for the network packet a unique packet identifier;
calculate for the read request message a start byte offset indicating a relative location of a first completion byte of the read request message within the network packet;
store the unique packet identifier and the start byte offset as an entry within a transmission database, and
for the submitted read request message, receive one or more read response messages from the host interface and perform the following for each read response message:
associate the read response message with the entry of the transmission database;
extract the unique packet identifier from the transmission database; and
transform the read response message into a fabric cell by the following operations:
mark the fabric cell with the unique packet identifier;
mark the fabric cell with a byte offset indicating a relative start byte offset of the fabric cell within the network packet, wherein the byte offset is calculated by summing a relative start offset of the read request message and a relative location of the read response message within an entire stream of completion bytes of the read request message;

mark the fabric cell with a first flag when the fabric cell represents a first fabric cell of the network packet;

mark the fabric cell with a last flag when the fabric cell represents a last fabric cell of the network packet;

release the entry of the transmission database when the fabric cell is marked with the last flag; and submit the fabric cell over a fabric interface.

2. The transmission device according to claim 1, wherein read response messages that belong to different read request messages arrive out-of-order with respect to a read request submission order.

3. The transmission device according to claim 1, configured to submit the read request message over the host interface before processing the one or more read response messages.

4. The transmission device according to claim 1, wherein the read request message is responded to with multiple read response messages.

5. The transmission device according to claim 1, wherein the one or more read response messages received for the read request message are interleaved with one or more read response messages received for another read request message upon arrival.

6. The transmission device according to claim 1, wherein the host interface comprises a peripheral component interconnect express interface.

7. The transmission device according to claim 1, wherein the host interface comprises a quick path interconnect interface.

8. The transmission device according to claim 1, wherein the read request message comprises a peripheral component interconnect express (PCIe) read request, and wherein the one or more read response messages comprise completion transaction layer packets.

9. The transmission device according to claim 1, wherein the fabric cell comprises:

a payload field configured to store payload data; and a header field configured to store configuration data, wherein the unique packet identifier is set in the header field of the fabric cell, and wherein the byte offset is set in the header field of the fabric cell.

10. The transmission device according to claim 1, further comprising:

a direct memory access (DMA) engine configured to process the submitted read request message and arrival of the one or more read response messages; and an open transmission database configured to store the unique packet identifier and the start byte offset.

11. A transmission system comprising:

a transmission (TX) device; and a host memory coupled to the TX device by a host interface, wherein the TX device comprises a processor configured to:

submit a read request message over the host interface corresponding to a buffer of a network packet, the buffer representing the network packet or a part of the network packet;

assign for the network packet a unique packet identifier;

calculate for the read request message a start byte offset indicating a relative location of a first completion byte of the read request message within the network packet;

store the unique packet identifier and the start byte offset as an entry within a transmission database, and for the submitted read request message, receive one or more read response messages from the host interface and perform the following for each read response message:

associate the read response message with the entry of the transmission database;

extract the unique packet identifier from the transmission database;

transform the read response message into a fabric cell by the following operations:

mark the fabric cell with the unique packet identifier;

mark the fabric cell with a byte offset indicating a relative start byte offset of the fabric cell within the network packet, wherein the byte offset is calculated by summing a relative start offset of the read request message and a relative location of the read response message within an entire stream of completion bytes of the read request message;

mark the fabric cell with a first flag when the fabric cell represents a first fabric cell of the network packet;

mark the fabric cell with a last flag when the fabric cell represents a last fabric cell of the network packet;

release the entry of the transmission database when the fabric cell is marked with the last flag; and submit the fabric cell over a fabric interface, and wherein the host memory is configured to:

process the read request message submitted from the TX device; and respond to the read request message with one or more read response messages.

12. The transmission system according to claim 11, wherein the TX device further comprises:

a direct memory access (DMA) engine configured to process the submitted read request message and the arrival of one or more read response messages; and an open transmission database configured to store the unique packet identifier and the start byte offset.

13. A reception device comprising a processor configured to perform the following operations upon reception of a fabric cell:

when the fabric cell is marked with a first flag:

extract a packet identifier from the fabric cell;

allocate a new reception (RX) buffer from an RX ring buffer of a host memory and obtain an RX buffer address;

associate the packet identifier and the RX buffer address by adding the packet identifier and the RX buffer address as an entry in a reassembly database;

write a payload of the fabric cell to an address of the host memory, the address corresponding to the RX buffer address incremented by a byte offset extracted from the fabric cell;

when the fabric cell is not marked with the first flag:

extract the packet identifier from the fabric cell;

lookup the packet identifier in the reassembly database;

extract the RX buffer address from the reassembly database;

write a payload of the fabric cell to the address of the host memory, the address corresponding to the RX buffer address incremented by a byte offset extracted from the fabric cell, wherein when the fabric cell is marked with a last flag, the processor is further configured to:
delete the entry in the reassembly database after a payload of the fabric cell is written to the address of host memory;
notify a driver that a new network packet has arrived; and
notify the driver of any error conditions that were encountered.

14. The reception device according to claim 13, further comprising:
a direct memory access (DMA) engine configured to process the reception of the fabric cell; and
an open reassembly database configured to store the packet identifier and the RX buffer address.

15. A reception system comprising:
a reception (RX) device; and
a host memory coupled to the RX device by a host interface,
wherein the RX device comprises a processor, and wherein upon reception of a fabric cell, the processor is configured to:
when the fabric cell is marked with a first flag:
extract a packet identifier from the fabric cell;
allocate a new RX buffer from an RX ring buffer of the host memory and obtain an RX buffer address;
associate the packet identifier and the RX buffer address by adding the packet identifier and the RX buffer address as an entry in a reassembly database;
write a payload of the fabric cell to an address of the host memory, the address corresponding to the RX buffer address incremented by a byte offset extracted from the fabric cell;
when the fabric cell is not marked with a first flag:
extract the packet identifier from the fabric cell;
lookup the packet identifier in the reassembly database;
extract the RX buffer address from the reassembly database;
write a payload of the fabric cell to the address of the host memory, the address corresponding to the RX buffer address incremented by a byte offset extracted from the fabric cell,
wherein when the fabric cell is marked with a last flag, the processor is further configured to:
delete the entry in the reassembly database after a payload of the fabric cell is written to the address of the host memory;
notify a driver that a new network packet has arrived; and
notify the driver of any error conditions that were encountered, and
wherein the host memory comprises:
one or more RX buffers; and
the RX ring buffer configured to hold addresses of the one or more RX buffers.

16. The reception system according to claim 15, wherein the RX device comprises:
a direct memory access (DMA) engine configured to process the reception of the fabric cell; and
an open reassembly database configured to store the packet identifier and the RX buffer address.

17. A transmission method comprising:
submitting a read request message over a host interface corresponding to a buffer of a network packet, wherein the buffer represents the network packet or a part of the network packet assigning for the network packet a unique packet identifier;
calculating for the read request message a start byte offset indicating a relative location of a first completion byte of the read request message within the network packet;
storing the unique packet identifier and the start byte offset as an entry within a transmission database, and
for the submitted read request message, receiving one or more read response messages and performing the following for each read response message:
associating the read response message with the entry of the transmission database;
extracting the unique packet identifier from the transmission database; and
transforming the read response message into a fabric cell by the following operations:
marking the fabric cell with the unique packet identifier;
marking the fabric cell with a byte offset indicating a relative start byte offset of the fabric cell within the network packet, wherein the byte offset is calculated by summing a relative start offset of the read request message and a relative location of the read response message within an entire stream of completion bytes of the read request message;
marking the fabric cell with a first flag when the fabric cell represents a first fabric cell of the network packet;
marking the fabric cell with a last flag when the fabric cell represents a last fabric cell of the network packet;
releasing the entry of the transmission database when the fabric cell is marked with the last flag; and
submitting the fabric cell over a fabric interface.

18. A reception method performed upon reception of a fabric cell, wherein the method comprises;
when the fabric cell is marked with a first flag:
extracting a packet identifier from the fabric cell;
allocating a new reception (RX) buffer from an RX ring buffer of a host memory and obtaining an RX buffer address;
associating the packet identifier and the RX buffer address by adding the packet identifier and the RX buffer address as an entry in a reassembly database; and
writing a payload of the fabric cell to an address of the host memory, the address corresponding to the RX buffer address incremented by a byte offset extracted from the fabric cell;
when the fabric cell is marked with a first flag:
extracting the packet identifier from the fabric cell;
looking-up the packet identifier in the reassembly database;
extracting the RX buffer address from the reassembly database;
writing a payload of the fabric cell to the address of the host memory, the address corresponding to the RX buffer address incremented by a byte offset extracted from the fabric cell,
wherein when the fabric cell is marked with a last flag, the method further comprises:
deleting the entry in the reassembly database after a payload of the fabric cell is written to the address of the host memory;

notifying a driver that a new network packet has arrived; and notifying the driver of any error conditions that were encountered.

\* \* \* \* \*